(12) United States Patent
Park

(10) Patent No.: US 12,712,128 B2
(45) Date of Patent: Aug. 18, 2026

(54) MULTI-LAYERED CERAMIC CAPACITOR

(71) Applicant: Samsung Electronics Co., Ltd., Suwon-si (KR)

(72) Inventor: Junghwan Park, Suwon-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 158 days.

(21) Appl. No.: 18/750,189

(22) Filed: Jun. 21, 2024

(65) Prior Publication Data

US 2025/0149247 A1 May 8, 2025

(30) Foreign Application Priority Data

Nov. 2, 2023 (KR) ........................ 10-2023-0150283

(51) Int. Cl.
*H01G 4/232* (2006.01)
*H01G 4/012* (2006.01)
*H01G 4/30* (2006.01)

(52) U.S. Cl.
CPC ............. *H01G 4/232* (2013.01); *H01G 4/012* (2013.01); *H01G 4/30* (2013.01)

(58) Field of Classification Search
None
See application file for complete search history.

(56) References Cited

U.S. PATENT DOCUMENTS 6,370,010 B1 * 4/2002 Kuroda .................. H01G 4/232 361/308.1
6,721,153 B2 4/2004 Naito et al.
7,430,107 B2 * 9/2008 Fukudome ........... H05K 1/0231 361/321.1
11,227,722 B2 1/2022 Lee et al.
11,501,923 B2 11/2022 Fujita et al.
11,562,860 B2 * 1/2023 Tomizawa ............... H01G 4/12
2006/0249758 A1 * 11/2006 Feichtinger ............ H01G 4/232 257/246
2008/0218943 A1 * 9/2008 Sakata ................. H01G 9/0425 361/528
2013/0120901 A1 * 5/2013 Masuda ................. H01G 4/018 361/303
2023/0145085 A1 5/2023 Fujita
2025/0149247 A1 * 5/2025 Park ....................... H01G 4/232

FOREIGN PATENT DOCUMENTS

CN 101325095 A * 12/2008 ............... H01G 4/30
JP 2006-332330 A 12/2006
JP 3987718 B2 10/2007
JP 5438485 B2 * 3/2014

OTHER PUBLICATIONS

Translation CN ’095 (Year: 2008).*
Translation JP ’485 (Year: 2009).*

* cited by examiner

*Primary Examiner* — Dion R. Ferguson
(74) *Attorney, Agent, or Firm* — Fish & Richardson P.C.

(57) ABSTRACT

Provided is a multi-layered ceramic capacitor in which a penetration-type electrode unit, which is manufactured in a cone shape, passes through a plurality of internal electrodes in a collective stack of the internal electrodes and the dielectric layers, so that the capacitor is miniaturized and the electrical reliability thereof is improved.

20 Claims, 18 Drawing Sheets

FIG. 7B
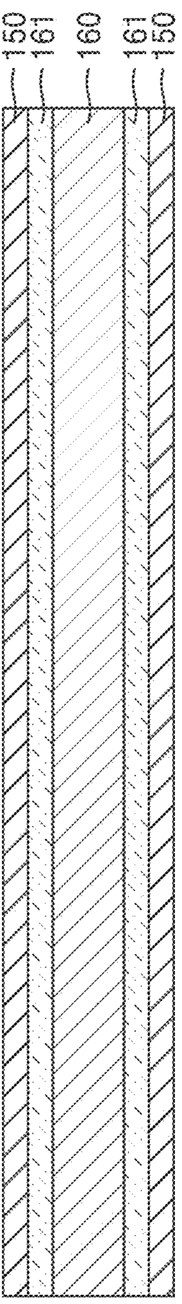

MULTI-LAYERED CERAMIC CAPACITOR

CROSS-REFERENCE TO RELATED APPLICATION

This application is based on and claims priority under 35 U.S.C. § 119 to Korean Patent Application No. 10-2023-0150283, filed on Nov. 2, 2023, in the Korean Intellectual Property Office, the disclosure of which is incorporated by reference herein in its entirety.

BACKGROUND

The inventive concepts relate to capacitors. More particularly, the inventive concepts relate to multi-layered ceramic capacitors.

A multi-layered ceramic capacitor includes a plurality of layered dielectric layers, a plurality of internal electrode arranged to face each other with the dielectric layers therebetween, and external electrodes electrically connected to the plurality of internal electrodes. Multi-layered ceramic capacitors have been widely used in electronic devices such as computers and/or control modules due to their small size, high capacity, and easy mounting. As electronic devices have recently become smaller and more functional, chip components have also become smaller and more functional, and thus, multi-layered ceramic capacitors that are both small in size and high in capacity have been demanded.

SUMMARY

The inventive concepts provide a multi-layered ceramic capacitor with improved equivalent series inductance (ESL) characteristics.

In addition, the objective is not limited to the objective described above, and other objectives could be clearly understood by a person skilled in the art from the description below.

The inventive concepts provide a multi-layered ceramic capacitor as below.

According to an aspect of the inventive concepts, there is provided a multi-layered ceramic capacitor including a ceramic body including a dielectric layer, a plurality of first internal electrodes in the dielectric layer, and a plurality of second internal electrodes in the dielectric layer such that the dielectric layer spaces the plurality of first internal electrodes apart from the plurality of second internal electrodes, a first conductive electrode unit passing through the ceramic body in a third direction and electrically connected to the plurality of first internal electrodes, a second conductive electrode unit passing through the ceramic body in the third direction and electrically connected to the plurality of second internal electrodes, and first and second external electrodes on a first surface of the ceramic body, the first and second external electrodes connected to the first conductive electrode unit and the second conductive electrode unit, respectively, wherein the first and second conductive electrode units have a cone shape.

According to an aspect of the inventive concepts, there is provided a multi-layered ceramic capacitor including a ceramic body including a dielectric layer, a plurality of first internal electrodes, and a plurality of second internal electrodes, the plurality of first internal electrodes and the plurality of second internal electrodes alternating with each other with the dielectric layer between the plurality of first internal electrodes and the plurality of second internal electrodes, an external electrode on an upper surface of the ceramic body, a first conductive electrode unit passing through the plurality of first internal electrodes in the ceramic body and electrically connected to the external electrode, a second conductive electrode unit passing through the plurality of second internal electrodes in the ceramic body and electrically connected to the external electrode, and a lower dielectric layer in contact with lower surfaces of the first and second conductive electrode units and the ceramic body, wherein the first and second conductive electrode units have a cone shape.

According to an aspect of the inventive concepts, there is provided a multi-layered ceramic capacitor including a ceramic body including a dielectric layer and a plurality of internal electrodes, the plurality of internal electrodes alternative with each other, a plurality of conductive electrode units connected to the plurality of internal electrodes, and passing through the ceramic body in a direction parallel to a direction in which the dielectric layer and the plurality of internal electrodes are stacked such that the plurality of conductive electrode units protrudes from a first surface of the ceramic body, a plurality of hemispherical external electrodes on the first surface of the ceramic body and such that each of the plurality of hemispherical external electrodes are on a corresponding protrusion of the protrusions of the plurality of conductive electrode units, wherein the plurality of conductive electrode units each have a cone shape in which a diameter increases with distance from the first surface to the second surface of the ceramic body.

BRIEF DESCRIPTION OF THE DRAWINGS

Embodiments of the inventive concepts will be more clearly understood from the following detailed description taken in conjunction with the accompanying drawings in which:

FIG. 2 is a cross-sectional view taken along line A-A' in FIG. 1;

FIGS. 7A to 7I are diagrams illustrating a sequential manufacturing process for a multi-layered ceramic capacitor, according to at least one embodiment.

DETAILED DESCRIPTION OF THE EMBODIMENTS

Figure 1:
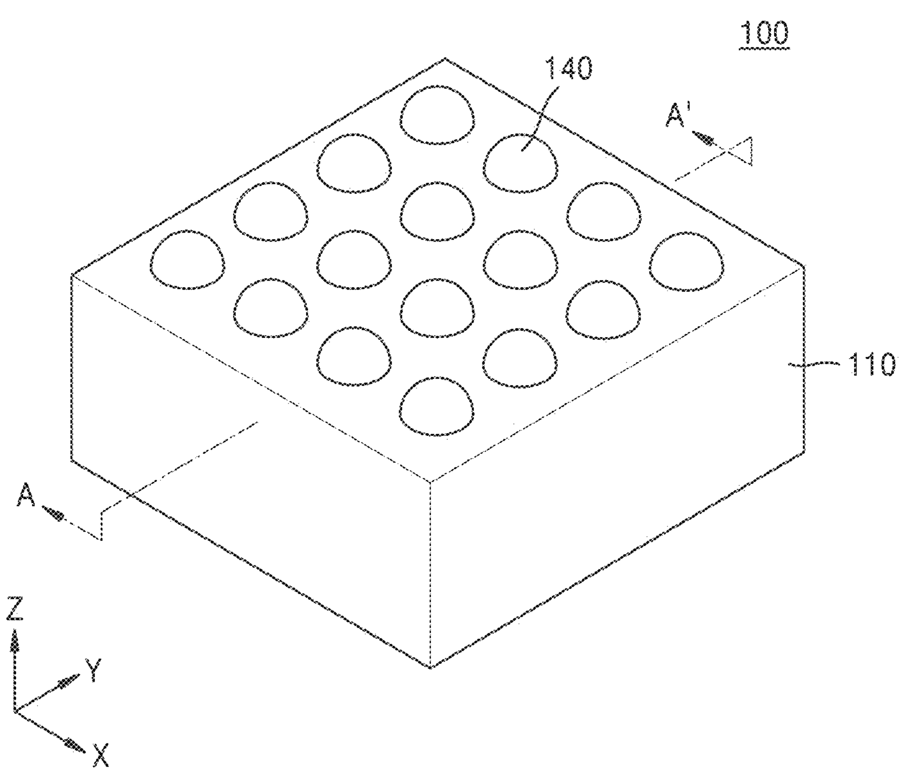
FIG. 1 is a schematic perspective view illustrating a multi-layered ceramic capacitor according to at least one embodiment.

Hereinafter, embodiments are described in detail with reference to the accompanying drawings. In the drawings, the same reference characters are used for the same elements, and redundant descriptions thereof are omitted. Additionally, spatially relative terms, such as "beneath," "below," "lower," "under," "above," "upper," and the like, may be used herein for ease of explanation to describe one element or feature's relationship to another element or feature as illustrated in the figures. It will be understood that the spatially relative terms are intended to encompass different orientations of the device in use or in operation, in addition to the orientation depicted in the figures. For example, device may be otherwise oriented, for example, rotated 90 degrees or at other orientations, and the spatially relative descriptors used herein should be interpreted accordingly.

Because the present embodiments may be modified in various ways and have various embodiments, specific embodiments are illustrated in the drawings and described in detail in the detailed description. However, this is not intended to limit the scope to specific embodiments, and should be understood to include all modifications, equivalents, and substitutes included in the disclosed spirit and technical scope. In the description of embodiments, when it is determined that detailed description of related known technologies may obscure the point, the detailed description thereof may be omitted. Additionally, when the terms "about" or "substantially" are used in this specification in connection with a numerical value, it is intended that the associated numerical value includes a manufacturing tolerance (e.g., ±10%) around the stated numerical value. Further, regardless of whether numerical values are modified as "about" or "substantially," it will be understood that these values should be construed as including a manufacturing or operational tolerance (e.g., ±10%) around the stated numerical values and/or geometry. When referring to "C to D", this means C inclusive to D inclusive unless otherwise specified.

Figure 2:
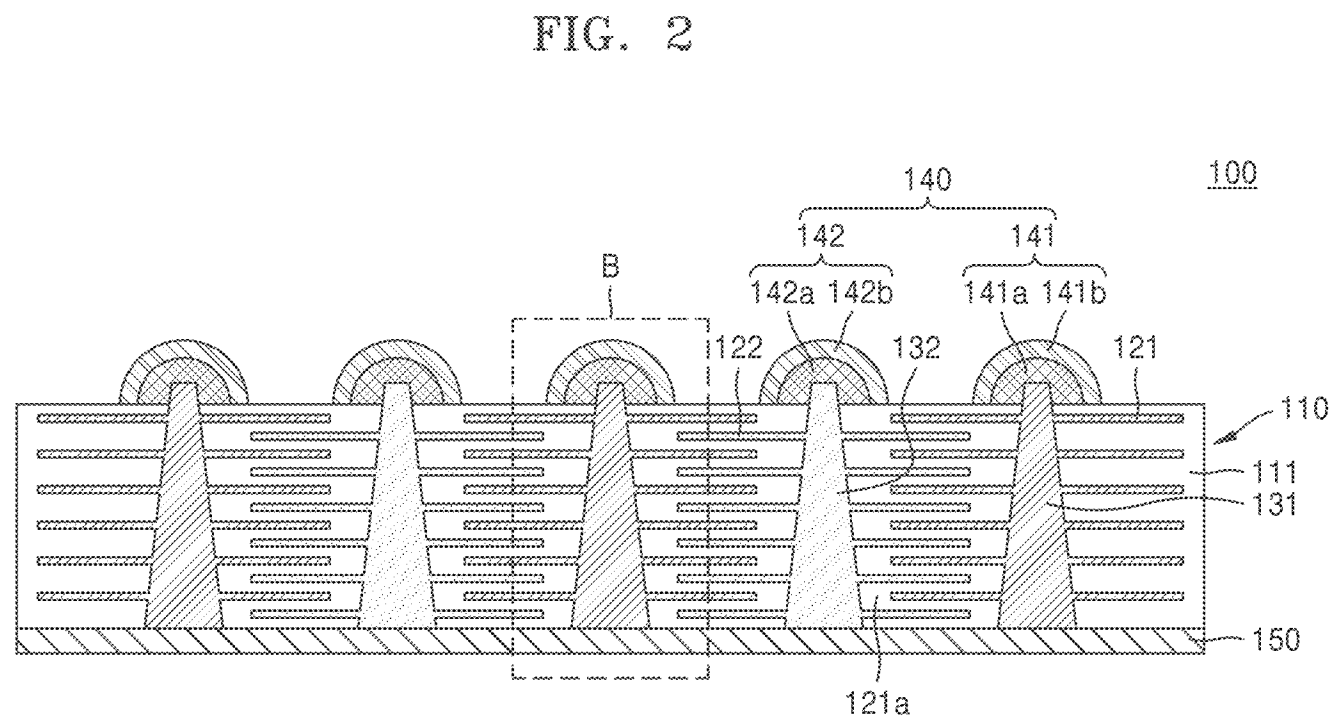
Figure 3:
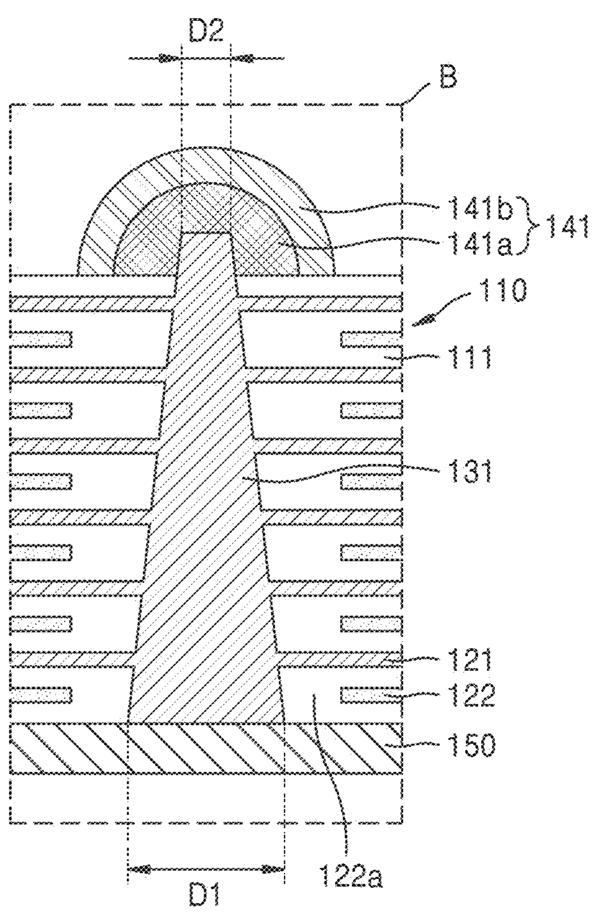
FIG. 3 is an enlarged cross-sectional view of region B in FIG. 2.

FIG. 1 is a perspective view illustrating a multi-layered ceramic capacitor 100 according to at least one embodiment, FIG. 2 is a cross-sectional view taken along line A-A' in FIG. 1, and FIG. 3 is an enlarged cross-sectional view of region B in FIG. 2.

Hereinafter, the multi-layered ceramic capacitor 100 according to at least one embodiment is described in detail with reference to FIGS. 1 to 3.

The multi-layered ceramic capacitor 100 according to at least one embodiment may include a ceramic body 110 that includes a dielectric layer 111 and first and second internal electrodes 121 and 122 arranged with the dielectric layer 111 therebetween; a lower dielectric layer 150 extending in a first direction (e.g., an X direction); a first conductive electrode unit 131 and a second conductive electrode unit 132 that extend in a third direction (e.g., a Z direction) perpendicular to the lower dielectric layer 150 and respectively pass through the first internal electrode 121 and the second internal electrode 122; and an external electrode 140 disposed over and electrically connected to the first and second conductive electrode units 131 and 132. In at least one embodiment, the external electrode 140 may include a plurality of first internal electrodes 141 and a plurality of second internal electrodes 142.

The ceramic body 110 includes an active layer as a portion that contributes to forming the capacitance of a capacitor, and upper and lower cover layers formed on upper and lower portions of the active layer as upper and lower margin areas, respectively. The active layer may include a structure in which the dielectric layer 111 and the internal electrodes 121 and 122 are alternately stacked with each other.

In some embodiments, the ceramic body 110 is not limited to any specific shape, but may have a substantially hexahedral shape, a substantially cubic shape, and/or a similar shape. During chip sintering, due to sintering shrinkage of a ceramic powder, a thickness difference due to the presence of an internal electrode pattern, and polishing of an edge area of the ceramic body 110, the ceramic body 110 may not have a completely hexahedral shape, but may be substantially hexahedral.

In order to clearly describe the technical idea of the inventive concepts, when directions of a hexahedron are defined, an X direction shown in the drawing may indicate a first direction or length direction, a Y direction may indicate a second direction or width direction, and a Z direction may indicate a third direction or thickness direction. Here, the thickness direction may be used as a concept the same as and/or substantially similar to a stacking direction in which the dielectric layers 111 are stacked.

In addition, in order to clearly describe the inventive concepts in the drawings, parts that are not relevant to the description are omitted, and to clearly express various layers and areas, a thickness is enlarged, and the same elements with the same function within the scope of the same idea are described by using the same reference character. Furthermore, throughout the specification, when a portion is described to "include" an element, this may mean that the portion may further include other elements rather than excluding other elements, unless specifically stated to the contrary.

In at least one embodiment, the plurality of dielectric layers 111, forming the ceramic body 110, are in a fired state, and boundaries between the dielectric layers 111 adjacent to each other may be integrated to the extent that it is difficult to identify without using a scanning electron microscope (SEM).

According to at least one embodiment, a raw material forming the dielectric layer 111 may be a material and/or materials selected from materials through which sufficient capacitance may be obtained. For example, barium titanate-based materials, lead-composite ferrosovite-based materials, strontium titanate-based materials, and/or the like may be used. In at least one embodiment, the barium titanate-based materials may include, for example, a $BaTiO_3$-based ceramic powder (for example, $(Ba_{1-x}Ca_x)TiO_3$, $Ba(Ti_{1-y}Ca_y)O_3$, $(Ba_{1-x}Ca_x)(Ti_{1-y}Zr_y)O_3$, $Ba(Ti_{1-y}Zr_y)O_3$, and/or the like, wherein x and y represent numbers between 0 to 1) in which calcium (Ca), zirconium (Zr), etc. are partially dissolved in $BaTiO_3$. A material forming the dielectric layer 111 may be obtained by adding various ceramic additives, organic solvents, plasticizers, binders, dispersants, etc. are added to a powder such as $BaTiO_3$, depending on the purpose and/or the selected properties of the dielectric layer 111.

The internal electrode may include a plurality of first internal electrodes 121 and a plurality of second internal electrodes 122. The first and second internal electrodes 121 and 122 may be arranged to face each other with the dielectric layer 111 therebetween. The first and second internal electrodes 121 and 122 are a pair of electrodes with different polarities from each other and may be formed on the dielectric layer 111 to have a certain (e.g., a predetermined) thickness. For example, the first and second internal electrodes 121 and 122 may be deposited to have the same and/or substantially similar thicknesses. The first and second internal electrodes 121 and 122 may be alternately arranged to face each other with the dielectric layer 111 therebetween.

In this case, the first and second internal electrodes 121 and 122 may include first and second insulating units **121*a* and 122*a*, respectively. The first and second insulating units 121*a* and 122*a* respectively denote areas in which the first and second internal electrodes 121 and 122 are not formed, and allows for the first and second internal electrodes 121 and 122 to be respectively connected only to external electrodes with different polarities from each other. In other words, the first conductive electrode unit 131 may be spaced apart from the second internal electrode 122 by the first insulating unit 121***a*, and the second conductive electrode unit 132 may be spaced apart from the first internal electrode 121 by the second insulating unit 122*a*.

When the first and second internal electrodes 121 and 122 are respectively connected to the first and second external electrodes 141 and 142 by the first and second conductive electrode units 131 and 132, an area in which the first and second internal electrodes 121 and 122 overlap each other with the dielectric layer 111 therebetween may be maximized, and accordingly, capacitance of the multi-layered ceramic capacitor 100 may be significantly increased.

The first and second conductive electrode units 131 and 132 may contain a conductive material, and may contain the largest amount of nickel (Ni), but are not limited thereto. For example, the first and second conductive electrode units 131 and 132 may be formed by using a conductive paste that contains at least one material from among silver (Ag), palladium (Pd), gold (Au), platinum (Pt), Ni, tin (Sn), copper (Cu), tungsten (W), palladium (Pd), titanium (Ti), and/r an alloy thereof. In at least one embodiment, the first and second conductive electrode units 131 and 132 may be formed to be attached onto the lower dielectric layer 150 by applying the conductive paste onto the lower dielectric layer 150 by an additive processes (e.g., screen printing).

In at least one embodiment, the first and second conductive electrode units 131 and 132 may be formed in a cone shape with a narrowing cross-sectional area in the third direction (the Z direction). For example, a diameter of a cross-section may increase with distance from the external electrodes 140 (e.g., from the top to the bottom). In at least one embodiment, a difference between a minimum diameter D2 and a maximum diameter D1 of the first and second conductive electrode units 131 and 132 may be about 10 μm or more; and/or, the maximum diameter D1 of the first and second conductive electrode units 131 and 132 may satisfy a range of about 20 μm to about 100 μm.

In at least one embodiment, because the first and second conductive electrode units 131 and 132 may partially protrude from an upper surface of the ceramic body 110, a cross-section of a portion having the minimum diameter D2 in the first and second conductive electrode units 131 and 132 may be arranged at a vertical level higher than a vertical level of the upper surface of the ceramic body 110.

In at least one embodiment, the first and second conductive electrode units 131 and 132 may pass through, in an collective stacking manner, the ceramic body 110 on which the dielectric layer 111 and the first and second internal electrodes 121 and 122 are repeatedly formed, so that the first and second internal electrodes 121 and 122 and the first and second conductive electrode units 131 and 132 are electrically connected.

In at least one embodiment, the first and second internal electrodes 121 and 122 and the first and second conductive electrode units 131 and 132 may include a same metal component. The same metal component may be, e.g., Ni, but is not limited thereto, and may be at least one of, for example, Ag, Pd, Au, Pt, Ni, Sn, Cu, W, Pd, Ti, and/or an alloy thereof.

When the first and second internal electrodes 121 and 122 and the first and second conductive electrode units 131 and 132 of the multi-layered ceramic capacitor include the same metal component, a firing start temperature and/or firing shrinkage rate may be matched, so that cracks or delamination may be prevented from occurring. However, the inventive concepts are not limited thereto, and the first and second internal electrodes 121 and 122 and the first and second conductive electrode units 131 and 132 may include different metal components from each other.

In at least one embodiment, the first and second conductive electrode units 131 and 132 may protrude in the third direction (the Z direction). Referring to FIG. 2, the first and second conductive electrode units 131 and 132 may protrude out of the upper surface of the ceramic body 110. First and second external electrodes 141 and 142 may be deposited on the protrusions. In at least one embodiment, the first and second external electrodes 141 and 142 comprise first and second electrode units 141*a* and 142*a* and first and second external electrodes 141*b* and 142*b*. The first and second electrode units 141*a* and 142*a* may be formed on the protrusion out of the ceramic body 110 by plating the protrusions with Cu, Ni, and/or Sn, and/or plating with Ni and/or Sn, so that final first and second external electrodes 141*b* and 142*b* (configured to protect the electrode units 141*a* and 142*a*) may be formed. In at least one embodiment, the first and second external electrodes 141 and 142 may have a hemispherical shape. However, the shapes and sizes of the first and second external electrodes 141 and 142 are not limited to those of the drawings. External electrodes adjacent to each other may be formed to be physically spaced apart from each other. In addition, components of the first and second external electrodes 141 and 142 may be Cu and/or Ni and/or Sn, but the inventive concepts is not limited thereto, and may be at least one of Cu, Ni, Sn, Ag, Pd, Au, Pt, W, Ti, and/or an alloy thereof.

According to the inventive concepts, the first and second conductive electrode units 131 and 132 may be formed in a cone shape, and as a result, cross-sections of the first and second conductive electrode units 131 and 132 according to a stacking direction of the first and second internal electrodes 121 and 122 may be trapezoidal. The stacking direction of the first and second internal electrodes 121 and 122 may be the third direction (the Z direction), and when the cross-sections of the first and second conductive electrode units 131 and 132 with respect to the stacking direction of the first and second internal electrodes 121 and 122 are trapezoidal, such that a diameter of each of the first and second conductive electrode units 131 and 132 increases from the top to the bottom.

Figure 4:
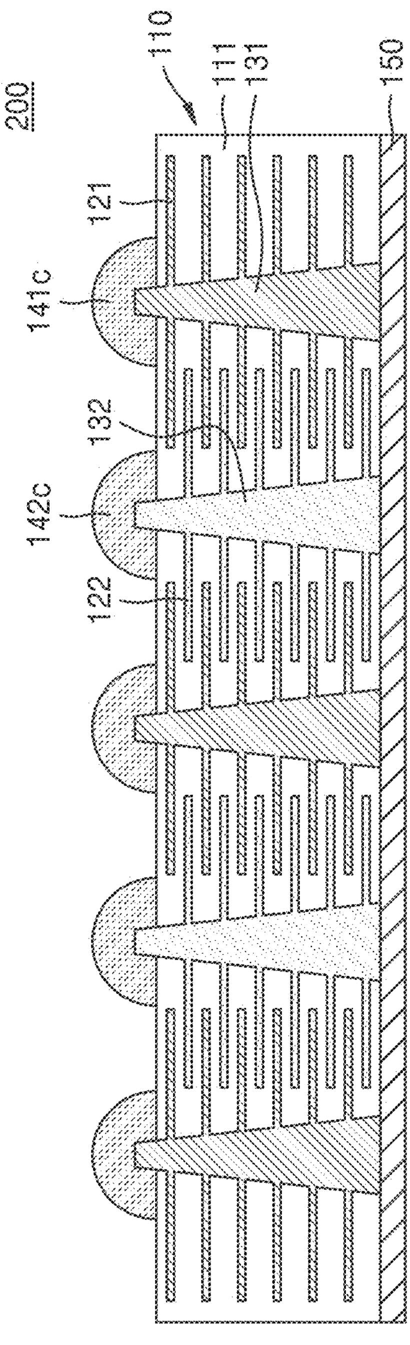
FIG. 4 is a schematic cross-sectional view illustrating a multi-layered ceramic capacitor according to at least one embodiment.

FIG. 4 is a schematic cross-sectional view illustrating a multi-layered ceramic capacitor 200 according to at least one embodiment.

In the multi-layered ceramic capacitor 200 in FIG. 4, it will be understood that the same members as those of the multi-layered ceramic capacitor 100 shown in FIGS. 1 to 3 denote the same element as the multi-layered ceramic capacitor 100 in FIGS. 1 to 3. Hereinafter, the same descriptions as those of the multi-layered ceramic capacitor 100 described with reference to FIGS. 1 to 3 are omitted, and differences are mainly described.

In the multi-layered ceramic capacitor 200 in FIG. 4, first and second external electrodes 141*c* and 142*c* do not include a plurality of layers, and thus, the first and second external electrodes 141*c* and 142*c* may be formed in a single process.

The first and second external electrodes 141*c* and 142*c* may be coating films formed, e.g., by performing organic solderability preservative (OSP) coating on the first and second conductive electrode units 131 and 132 protruding out of the ceramic body 110. In at least one embodiment, the first and second external electrodes 141*c* and 142*c* may have a hemispherical shape. However, the shapes and sizes of the first and second external electrodes 141*c* and 142*c* are not limited to those of the drawings. External electrodes adjacent to each other may be formed to be physically spaced apart from each other.

Figure 5A:
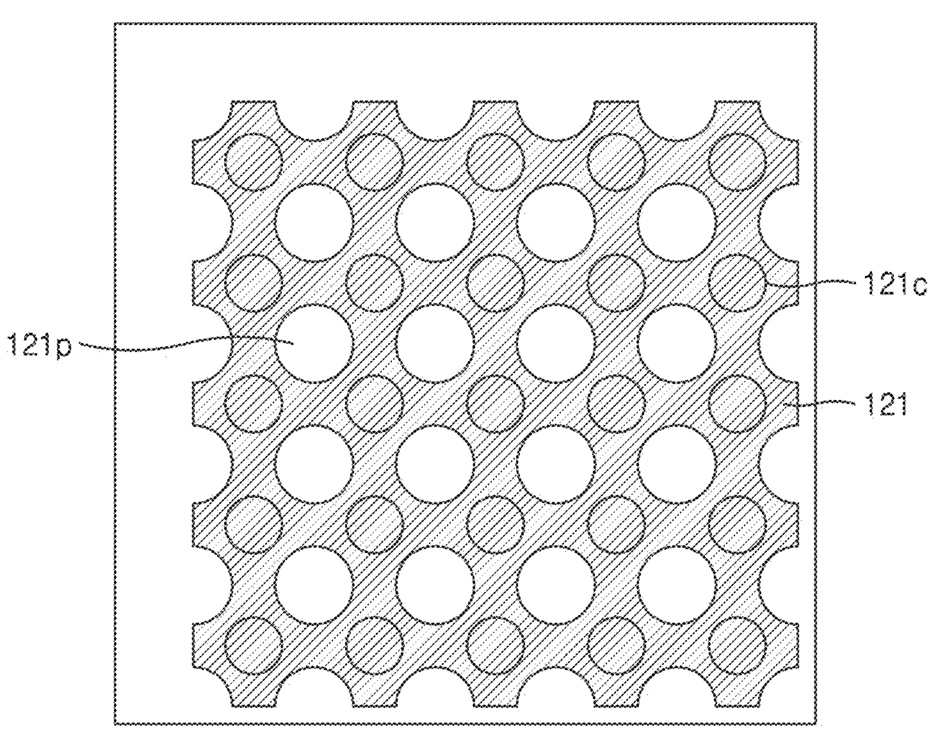
FIGS. 5A to 5C are horizontal cross-sectional views briefly illustrating internal electrodes included in a multi-layered ceramic capacitor, according to at least one embodiment.
Figure 5B:
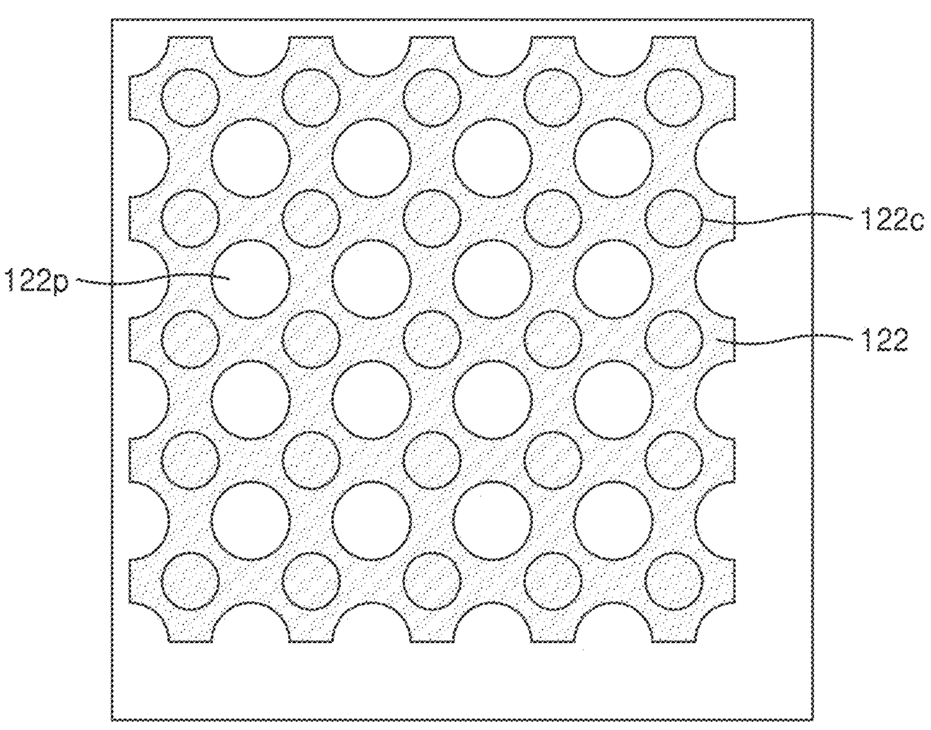
Figure 5C:
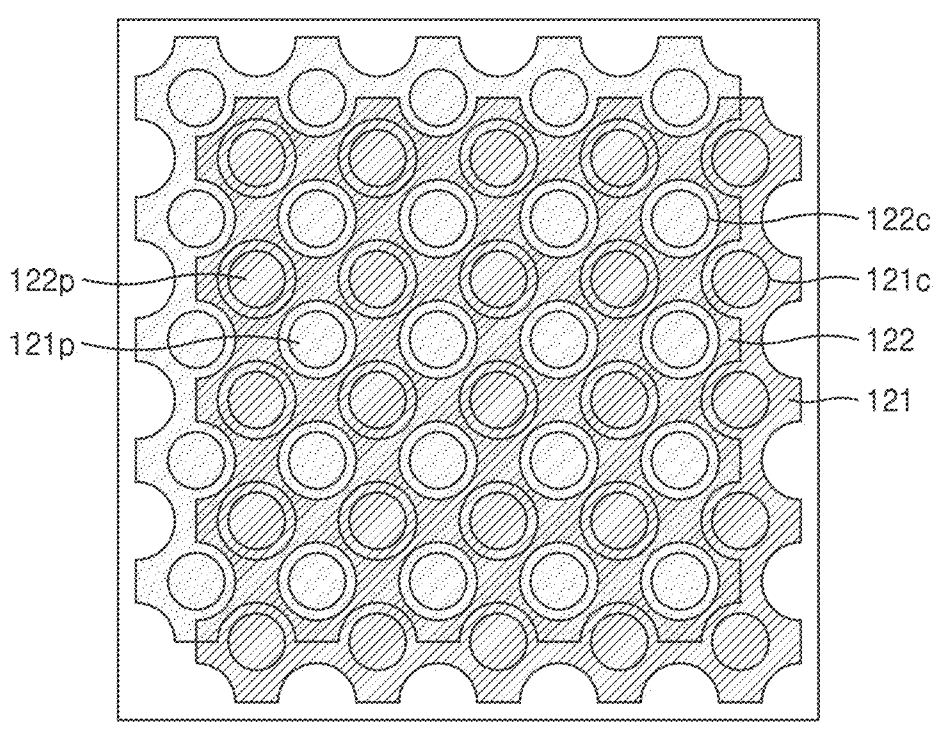

FIGS. 5A to 5C are horizontal cross-sectional views briefly illustrating internal electrodes included in a multi-layered ceramic capacitor, according to at least one embodiment. Specifically, FIGS. 5A and 5B are, respectively, horizontal cross-sectional views illustrating patterns of the first internal electrode 121 and the second internal electrode 122, and FIG. 5C represents a horizontal cross-sectional view the first internal electrode 121 in FIG. 5A and the second internal electrode 122 in FIG. 5B overlapping each other.

To efficiently increase capacities of the multi-layered ceramic capacitors 100 and/or 200, the first internal electrode 121 in FIG. 5A and the second internal electrode 122 in FIG. 5B may have opposite polarities to each other. In at least one embodiment, the first internal electrode 121 in FIG. 5A may be configured to have a positive polarity, and the second internal electrode 122 in FIG. 5B may be configured to have a negative polarity. In an alternate embodiment, the first internal electrode 121 in FIG. 5A may be configured to have a negative polarity, and the second internal electrode 122 in FIG. 5B may be configured to have a positive polarity.

The first and second internal electrodes 121 and 122 may be alternately stacked and formed with the dielectric layer 111 therebetween (see FIG. 2). When the first and second internal electrodes 121 and 122 are stacked such that a circular portion 121*c* in FIG. 5A overlaps a pattern portion 122*p* in FIG. 5B, and a pattern portion 121*p* in FIG. 5A overlaps a circular portion 122*c* in FIG. 5B, the result in FIG. 5C may be obtained.

The first and second internal electrodes 121 and 122 are arranged in a staggered manner such that the respective pattern portions 121*p* and 122*p* overlap the respective circular portions 121*c* and 122*c*, so that the first internal electrode 121 and the second conductive electrode unit 132 are spaced apart from each other, and the second internal electrode 122 and the first conductive electrode unit 131 are spaced apart from each other. Thus, the capacity efficiency of the multi-layered ceramic capacitors 100 and/or 200 may be maximized.

In FIGS. 5A to 5C, a pattern of each of the first and second internal electrodes 121 and 122 has a circular shape. However, this is only an example, and the inventive concepts are not limited thereto. For example, the first and second internal electrodes 121 and 122 may have a polygonal pattern.

Figure 6A:
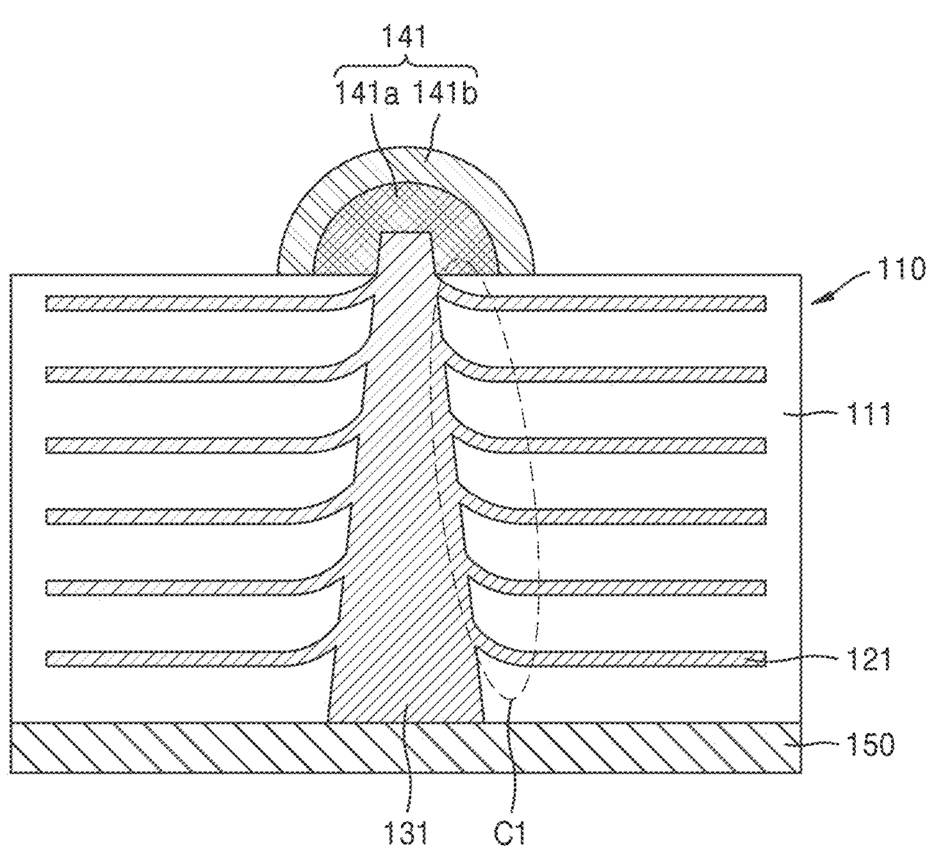
FIGS. 6A and 6B are schematic cross-sectional views illustrating a multi-layered ceramic capacitor according to at least one embodiment.
Figure 6B:
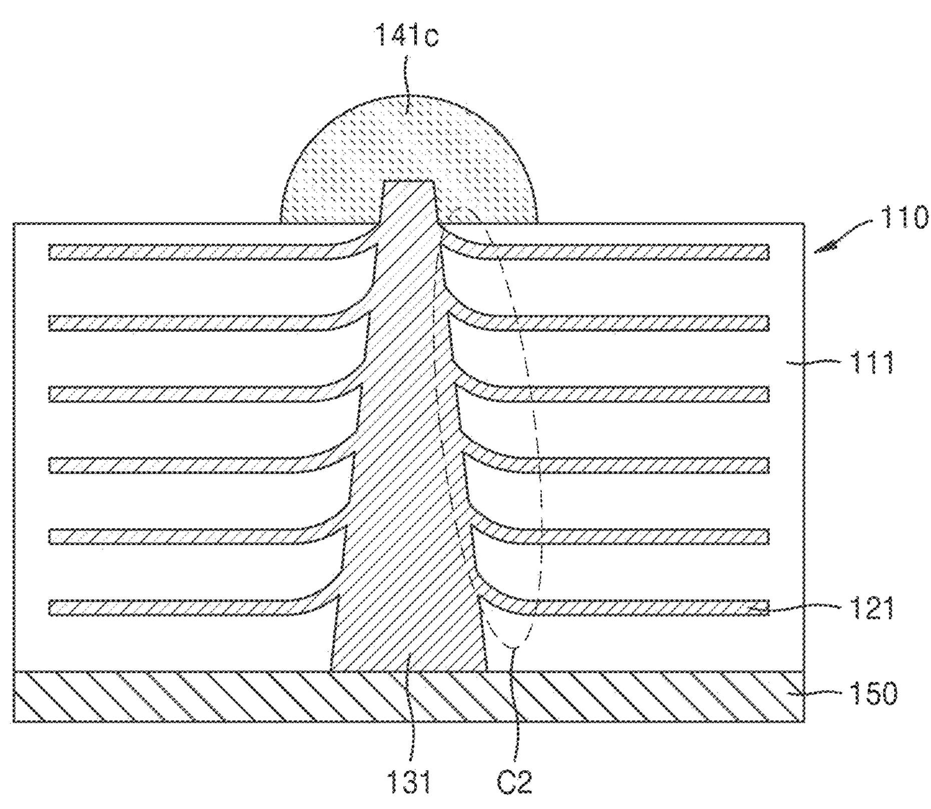

FIGS. 6A and 6B are schematic cross-sectional views illustrating a multi-layered ceramic capacitor 110 according to at least one embodiment.

Referring to FIGS. 6A and 6B, FIG. 6A may correspond to the multi-layered ceramic capacitor 100 in FIG. 2, and FIG. 6B may correspond to the multi-layered ceramic capacitor 200 in FIG. 4. For convenience of description, FIGS. 6A and 6B show only one conductive electrode unit, and as an internal electrode, only the first internal electrode 121 connected to one first conductive electrode unit 131 is shown. However, as shown in the cross-sectional views shown in FIGS. 2 and 4, in an actual multi-layered ceramic capacitor, a plurality of conductive electrode units may be arranged, and an internal electrode may have a structure in which an internal electrode having a positive polarity and internal electrodes having a negative polarity are sequentially stacked in the ceramic body.

Figure 7A:
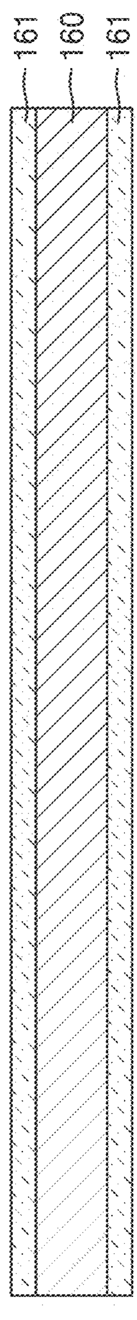
Figure 7C:
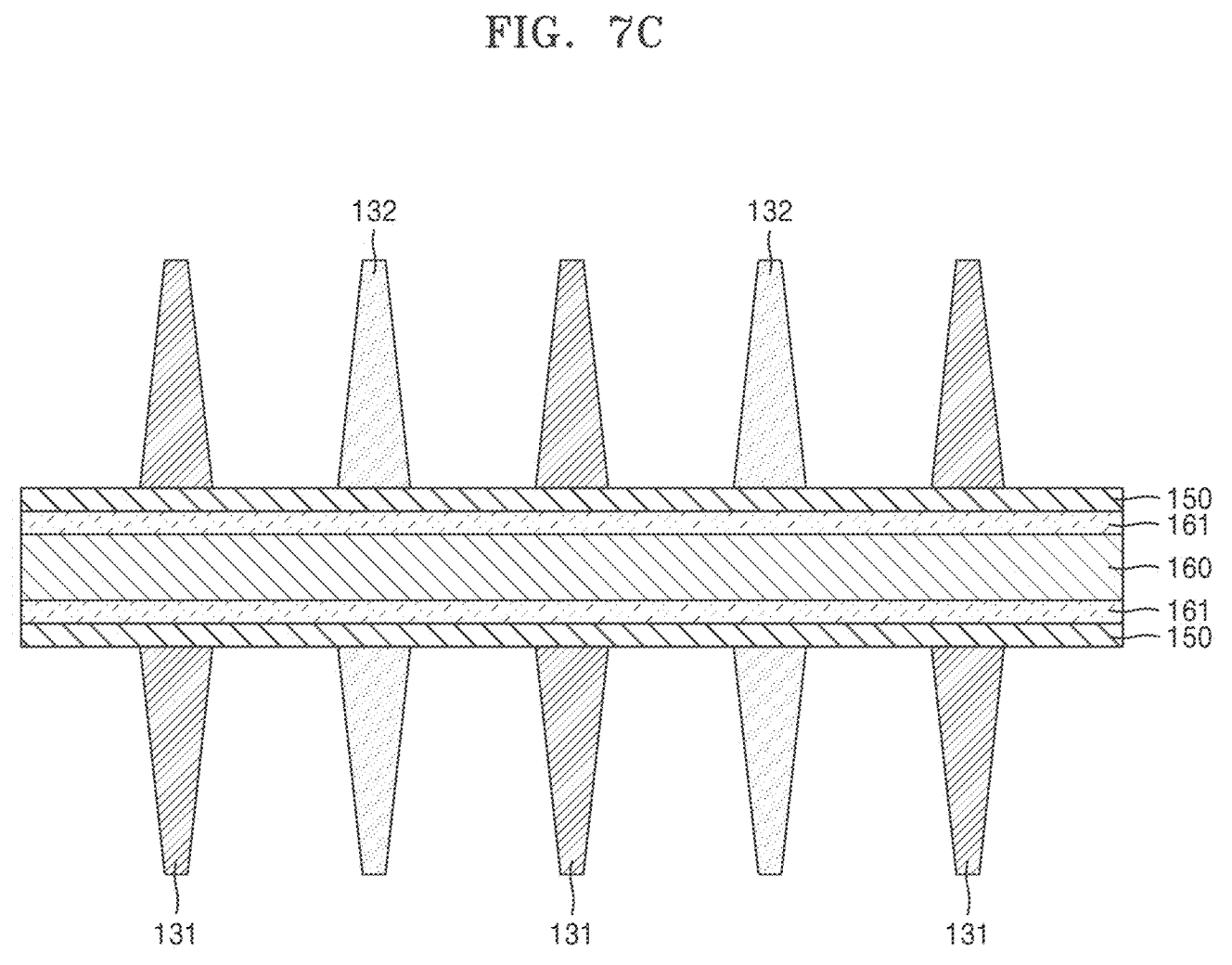
Figure 7D:
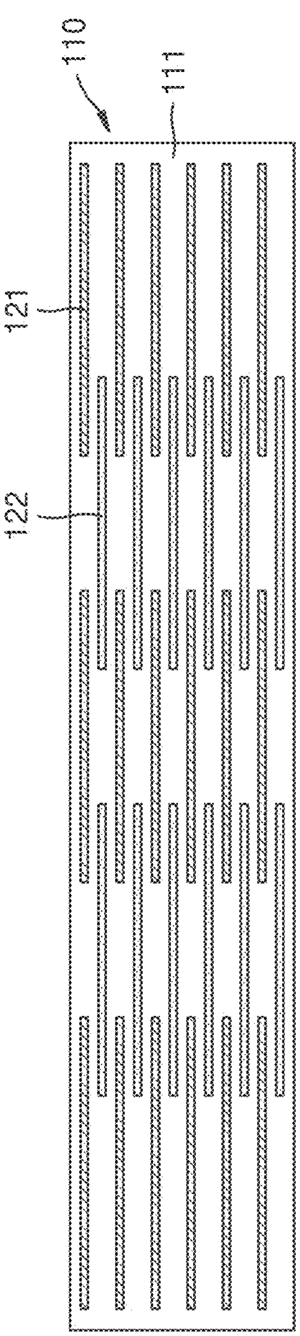
Figure 7E:
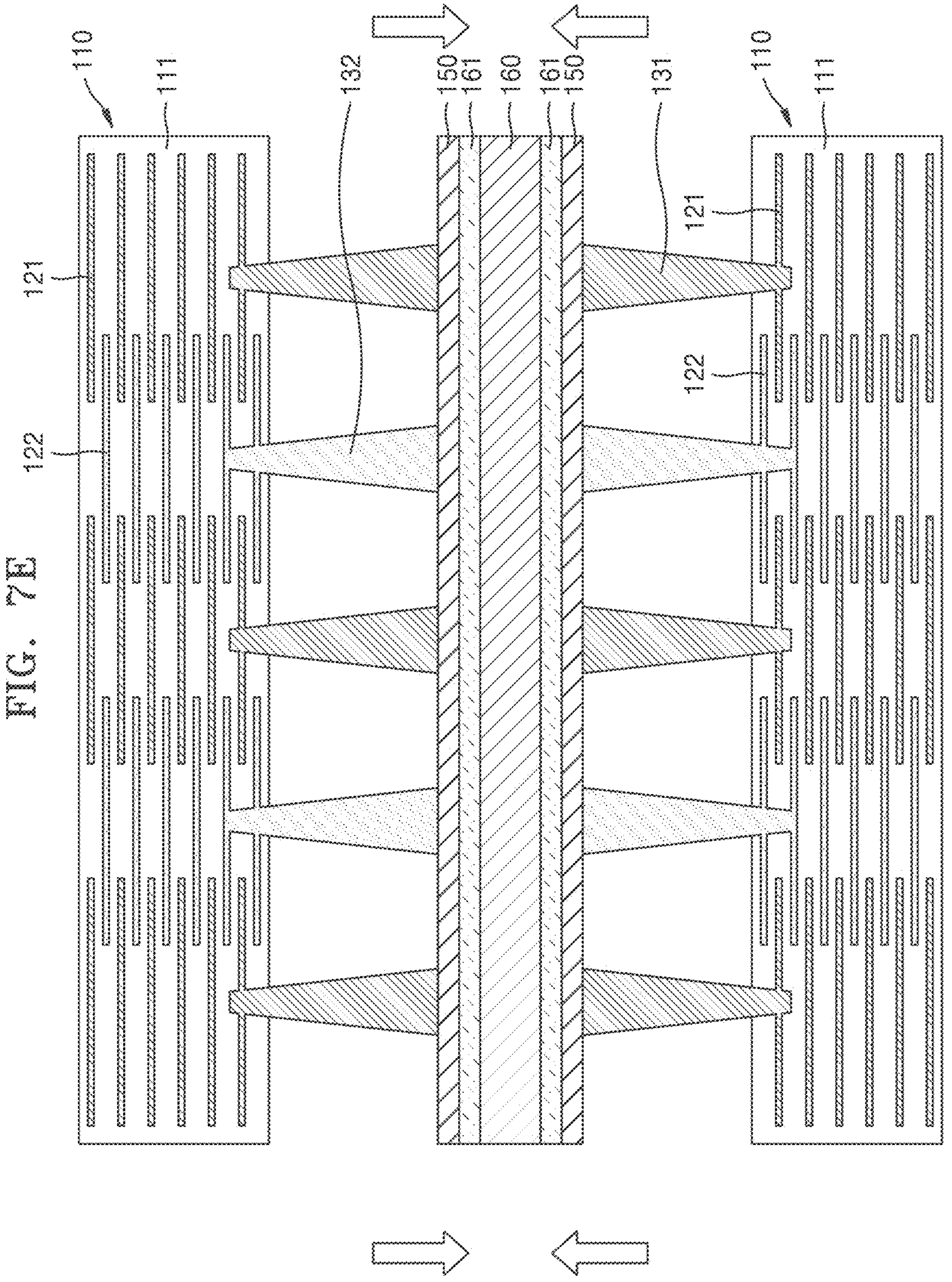
Figure 7F:
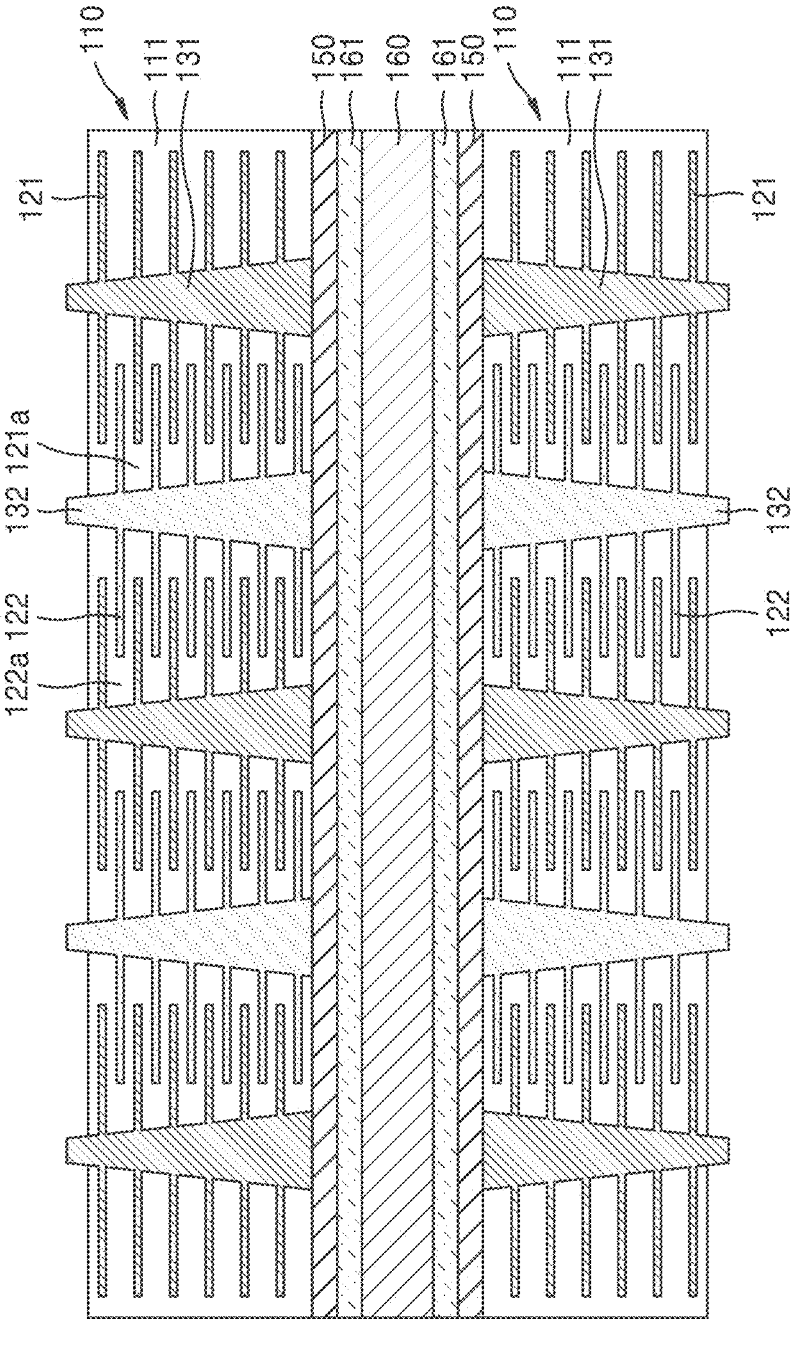

According to the inventive concepts, in a multi-layered ceramic capacitor, an internal electrode and a dielectric layer may be repeatedly formed in the ceramic body, and a cone-shaped conductive electrode unit may pass through the ceramic body in a collective stacking manner (see the process in FIGS. 7E and 7F). Accordingly, referring to C1 in FIG. 6A and C2 in FIG. 6B, the first internal electrode 121 of a portion adjacent to the first conductive electrode unit 131 may be bent in the third direction (the Z direction) through which the first conductive electrode unit 131 passes.

FIGS. 7A to 7I are diagrams illustrating a sequential manufacturing process for a multi-layered ceramic capacitor 100, according to at least one embodiment. A method of manufacturing the multi-layered ceramic capacitor 100 shown in FIG. 2 is described with reference to FIGS. 7A and 7I. From a description of this manufacturing method, the structure of the multi-layered ceramic capacitor 100 described above would be further clarified.

Referring to FIGS. 7A and 7B first, a carrier 160 for manufacturing the multi-layered ceramic capacitor 100 is prepared, and a metal layer 161 having a certain thickness may be formed on the upper and lower surfaces of the carrier 160. In at least one embodiment, the metal layer 161 may be obtained by plating metal on the carrier 160, e.g., using an electrical or chemical method. In at least one embodiment, the metal layer 161 may include Cu. Next, the lower dielectric layer 150 may be applied onto the respective metal layers 161, and may be obtained over and under the carrier 160. To maintain the flatness of the multi-layered ceramic capacitor 100, the lower dielectric layer 150 may be formed in a thickness greater than a thickness of a sub-layer of the dielectric layer 111 included in the multi-layered ceramic capacitor 100. In at least one embodiment, a difference between the thickness of the lower dielectric layer 150 and the thickness of a sub-layer of the dielectric layer 111 may be at least about 10 μm.

Referring to FIG. 7C, a plurality of first and second conductive electrode units 131 and 132 are formed on the lower dielectric layer 150 attached to each of the upper and lower surfaces of the carrier 160. In at least one embodiment, the first and second conductive electrode units 131 and 132 may include substantially the same material as each other and may be formed in substantially the same size as each other. Because the lower dielectric layer 150 is attached to both the upper and lower surfaces of the carrier 160, structures generated in the below processes including FIG. 7C may be formed in a symmetrical shape with respect to the carrier 160. In at least one embodiment, the first and second conductive electrode units 131 and 132 may be formed in a cone shape of which a diameter increases in a direction closer to the lower dielectric layer 150. Accordingly, cross-sections of the first and second conductive electrode units 131 and 132 with respect to the stacking direction of the first and second internal electrodes 121 and 122 may have a trapezoidal shape with long sides adjacent to the lower dielectric layer 150.

In at least one embodiment, in the first and second conductive electrode units 131 and 132, a difference between a maximum diameter and a minimum diameter may be at least about 10 μm. In at least one embodiment, the maximum diameters of the first and second conductive electrode units 131 and 132 may have a range from about 20 μm to about 100 μm. In at least one embodiment, although not shown in FIG. 7C, after a conductive paste is attached onto the lower dielectric layer 150, each of the first and second conductive electrode units 131 and 132 may be formed, e.g., by screen printing the first and second conductive electrode units 131 and 132 onto the lower dielectric layer 150.

Referring to FIG. 7D, the first and second internal electrodes 121 and 122, configured to have different polarities from each other, and the dielectric layer 111 may be repeatedly stacked to form the ceramic body 110. Because the process of FIG. 7D is performed independently of the process of FIGS. 7A to 7C, the process of FIG. 7D may be performed earlier than the process of FIGS. 7A to 7C and/or may be performed later than the process of FIGS. 7A to 7D. In at least one embodiment, the first and second internal electrodes 121 and 122 may include a same metal as the first and second conductive electrode units 131 and 132; or the first and second internal electrodes 121 and 122 may include a metal different from a metal included in the first and second conductive electrode units 131 and 132.

Next, referring to FIG. 7E, the ceramic body 110 in FIG. 7D are stacked on the result of FIG. 7C in a collective stacking manner. Through the process described above, the first and second conductive electrode units 131 and 132 may pass through the ceramic body 110. Because the lower dielectric layer 150 and the first and second conductive electrode units 131 and 132 are formed on opposite surfaces of the carrier 160, two ceramic bodies 110 may be respectively stacked on the upper and lower portions of the carrier 160.

Referring to FIG. 7F, the first internal electrode 121 and the first conductive electrode unit 131 are connected to each other, and the second internal electrode 122 and the second conductive electrode unit 132 may be connected to each other. In this case, the first insulating unit 121*a* and the second insulating unit 122*a* may refer to areas in which the first internal electrode 121 and the second internal electrode 122 are not formed, respectively. For example, the first insulating unit 121*a* and the second insulating unit 122*a* may correspond to the pattern portions 121*p* and 122*p* of FIGS. 5A and 5B. Accordingly, the first internal electrode 121 may be physically spaced apart from the second conductive electrode unit 132 by the first insulating unit 121*a*, and the second internal electrode 122 may be physically spaced apart from the first conductive electrode unit 131 by the second insulating unit 122*a*. The first and second internal electrodes 121 and 122 may be connected only to external electrodes of different polarities by the first and second insulating units 121*a* and 122*a*.

As shown in FIGS. 6A and 6B, the first and second internal electrodes 121 and 122 may be coupled in a bendable shape substantially in the third direction (the Z direction) on surfaces in contact with the first and second conductive electrode units 131 and 132, respectively, which may be a result of the ceramic body 110 and the first and second conductive electrode units 131 and 132 being combined with each other in a collective stacking manner. In at least one embodiment, the first and second conductive electrode units 131 and 132 may partially protrude from the upper surface of the ceramic body 110 in the third direction (the Z direction).

Figure 7G:
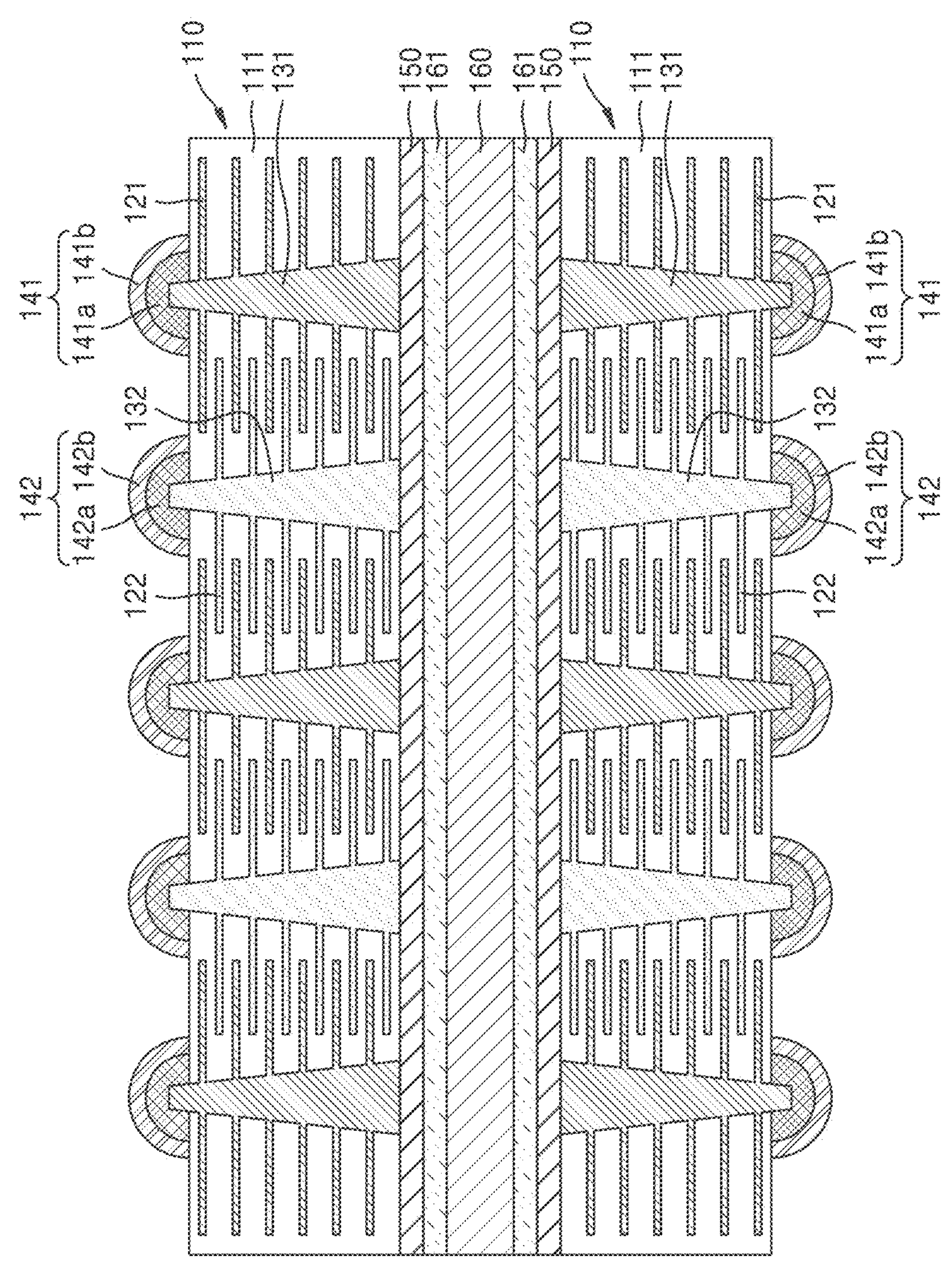

Referring to FIG. 7G, the first and second electrode units 141*a* and 142*b* may be formed on upper portions of the first and second conductive electrode units 131 and 132 exposed out of the ceramic body 110, and the first and second protective layers 141*b* and 142*b* may be respectively formed on the first and second electrode units 141*a* and 142*a* to obtain the first and second external electrodes 141 and 142. In at least one embodiment, the first and second external electrodes 141 and 142 may have a hemispherical shape and protrude out of the ceramic body 110. However, as noted above, the sizes and shapes of the first and second external electrodes 141 and 142 are not limited thereto, but adjacent external electrodes may be formed to be physically spaced apart and not in contact with each other.

Figure 7H:
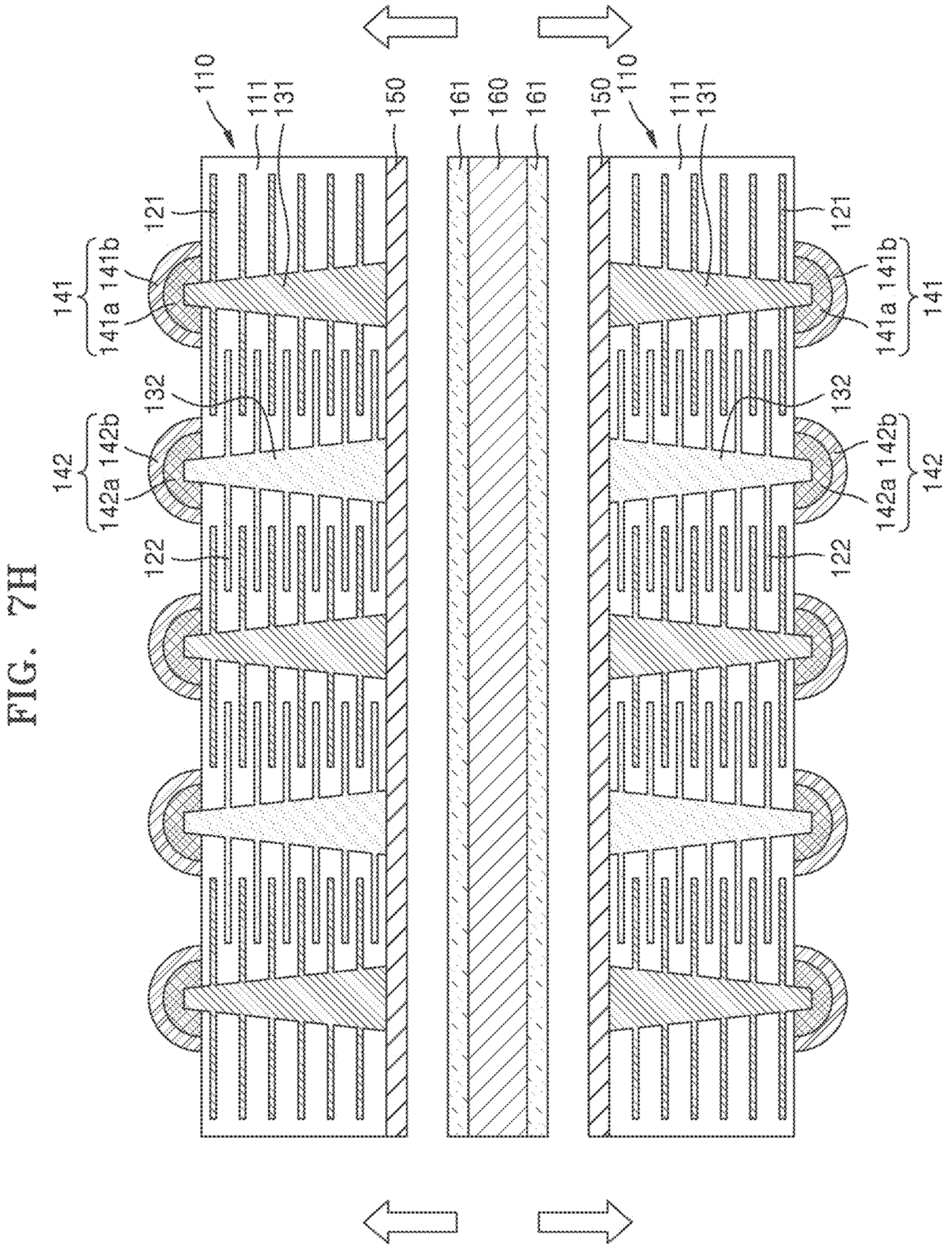
Figure 7I:
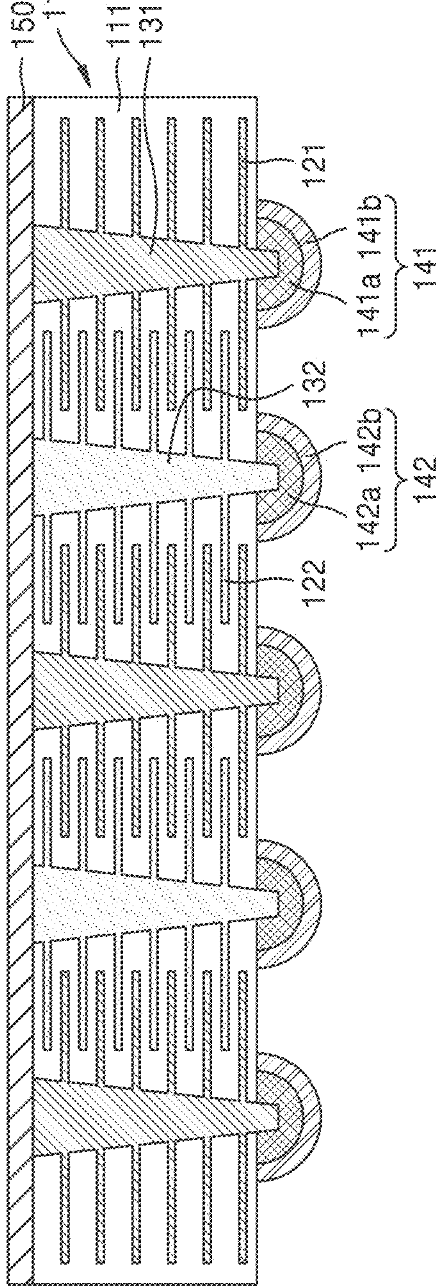

Finally, referring to FIGS. 7H and 7I, a structure including the lower dielectric layer 150, the ceramic body 110 disposed on the lower dielectric layer 150 and including the dielectric layer 111 and the first and second internal electrodes 121 and 122, the first and second conductive electrode units 131 and 132 passing through the ceramic body 110, and the external electrodes 141 and 142 connected to the first and second conductive electrode units 131 and 132 may be detached from the carrier 160. A method of detaching the ceramic body 110 from the carrier 160 is not limited thereto, but the ceramic body 110 may be detached by using physical and/or chemical methods that do not damage the ceramic body 110.

Through the above process, two multi-layered ceramic capacitors in FIG. 7I may be obtained with one carrier 160. The multi-layered ceramic capacitor in FIG. 7I may be substantially the same as the multi-layered ceramic capacitor 100 in FIG. 2.

Because FIGS. 7A to 7I illustrate a process of forming the multi-layered ceramic capacitor 100 in FIG. 2, in order to manufacture the multi-layered ceramic capacitor 200 in FIG. 4, in the manufacturing process described with reference to FIG. 7G, the first and second external electrodes may be obtained by forming the first and second coating films 141*c* and 142*c* (see FIG. 4) by using OSP instead of and/or in addition to a plating process. Except for the process shown in FIG. 7G, remaining processes may be identical to the manufacturing method of the multi-layered ceramic capacitor 100 described with reference to FIGS. 7A to 7F, 7H, and 7I.

As described above, in a multi-layered ceramic capacitor according to the inventive concepts, a plurality of external electrodes are formed on one surface, and a lower dielectric layer is coated on the other surface facing the one surface, and a conductive electrode unit may be manufactured in a cone shape and collectively stacked on a ceramic body. Thus, the equivalent series inductance (ESL) characteristics of the capacitor may be improved.

While the inventive concepts have been particularly shown and described with reference to embodiments thereof, it will be understood that various changes in form and details may be made therein without departing from the spirit and scope of the following claims.

What is claimed is:

1. A multi-layered ceramic capacitor comprising:

a ceramic body including a dielectric layer, a plurality of first internal electrodes in the dielectric layer, and a plurality of second internal electrodes in the dielectric layer such that the dielectric layer spaces the plurality of first internal electrodes apart from the plurality of second internal electrodes;

a first conductive electrode unit passing through the ceramic body in a third direction and electrically connected to the plurality of first internal electrodes;

a second conductive electrode unit passing through the ceramic body in the third direction and electrically connected to the plurality of second internal electrodes; and first and second external electrodes on a first surface of the ceramic body, the first and second external electrodes connected to the first conductive electrode unit and the second conductive electrode unit, respectively, wherein the first and second conductive electrode units have a cone shape, and wherein a top surface of at least one of the first or second conductive electrode units is at a level higher than the first surface of the ceramic body.

2. The multi-layered ceramic capacitor of claim 1, further comprising:

a lower dielectric layer on a second surface of the ceramic body, the second surface opposite to the first surface such that the first and second surfaces face each other in the third direction.

3. The multi-layered ceramic capacitor of claim 1, wherein a cross-sectional diameter of the cone shape increases from the first surface to a second surface of the ceramic body, the second surface opposite to the first surface such that the first and second surfaces face each other in the third direction.

4. The multi-layered ceramic capacitor of claim 1, wherein the cone shape comprises a polygonal horizontal cross-section.

5. The multi-layered ceramic capacitor of claim 1, wherein cross-sections of the first and second conductive electrode units, with respect to a stacking direction of the first and second internal electrodes, have a trapezoidal shape.

6. The multi-layered ceramic capacitor of claim 1, wherein a difference between a minimum diameter and a maximum diameter of the first and second conductive electrode units is about 10 μm or more.

7. The multi-layered ceramic capacitor of claim 1, wherein maximum diameters of the first and second conductive electrode units are within a range of about 20 μm to about 100 μm.

8. The multi-layered ceramic capacitor of claim 1, wherein the first and second external electrodes have a hemispherical shape and are spaced apart from each other.

9. The multi-layered ceramic capacitor of claim 1, wherein the first and second conductive electrode units comprise a same metal as the first and second internal electrodes.

10. The multi-layered ceramic capacitor of claim 1, wherein the first and second external electrodes each comprise at least one of copper (Cu), tin (Sn), or nickel (Ni).

11. The multi-layered ceramic capacitor of claim 1, wherein the first and second internal electrodes are bent in the third direction at a surface in contact with the first and second conductive electrode units.

12. A multi-layered ceramic capacitor comprising:

a ceramic body including a dielectric layer, a plurality of first internal electrodes, and a plurality of second internal electrodes, the plurality of first internal electrodes and the plurality of second internal electrodes alternating with each other with the dielectric layer between the plurality of first internal electrodes and the plurality of second internal electrodes;

an external electrode on an upper surface of the ceramic body;

a first conductive electrode unit passing through the plurality of first internal electrodes in the ceramic body and electrically connected to the external electrode;

a second conductive electrode unit passing through the plurality of second internal electrodes in the ceramic body and electrically connected to the external electrode; and a lower dielectric layer in contact with lower surfaces of the first and second conductive electrode units and of the ceramic body, wherein the first and second conductive electrode units have a cone shape, and wherein the first and second internal electrodes are bent toward the upper surface of the ceramic body at a surface in contact with the first and second conductive electrode units.

13. The multi-layered ceramic capacitor of claim 12, wherein a diameter of the cone shape increases from top to bottom.

14. The multi-layered ceramic capacitor of claim 12, wherein a difference between a minimum diameter and a maximum diameter of the first and second conductive electrode units is about 10 μm or more.

15. The multi-layered ceramic capacitor of claim 12, wherein maximum diameters of the first and second conductive electrode units are within a range of about 20 μm to about 100 μm.

16. The multi-layered ceramic capacitor of claim 12, wherein at least one of the first or second conductive electrode units protrudes out of the upper surface of the ceramic body.

17. The multi-layered ceramic capacitor of claim 12, wherein the external electrode includes an organic solderability preservative film on uppermost portions of the first and second conductive electrode units.

18. The multi-layered ceramic capacitor of claim 12, wherein the cone shape comprises a circular horizontal cross-sections.

19. A multi-layered ceramic capacitor comprising:

a ceramic body comprising a dielectric layer and a plurality of internal electrodes, the plurality of internal electrodes alternating with each other;

a plurality of conductive electrode units connected to the plurality of internal electrodes, and passing through the ceramic body in a direction parallel to a direction in which the dielectric layer and the plurality of internal electrodes are stacked such that the plurality of conductive electrode units protrude from a first surface of the ceramic body;

a plurality of hemispherical external electrodes on the first surface of the ceramic body each of the plurality of hemispherical external electrodes being disposed on a corresponding protrusion of the plurality of conductive electrode units protruding from the first surface of the ceramic body; and a lower dielectric layer on a second surface facing the first surface of the ceramic body, the lower dielectric layer in contact with the plurality of conductive electrode units, wherein the plurality of conductive electrode units each have a cone shape in which a diameter increases with distance from the first surface to the second surface of the ceramic body.

20. The multi-layered ceramic capacitor of claim 19, wherein a difference between a minimum diameter and a maximum diameter of the plurality of conductive electrode units is about 10 μm or more.

* * * * *